(12) United States Patent
Peiffer et al.

(10) Patent No.: US 10,618,260 B2
(45) Date of Patent: Apr. 14, 2020

(54) THERMOFORMABLE TRANSPARENT PACKING MADE OF POLYESTER WITH A LOWER FOIL AND AN UPPER FOIL, PROCESS FOR PRODUCTION THEREOF AND USE THEREOF

(71) Applicant: Mitsubishi Polyester Film GmbH, Wiesbaden (DE)

(72) Inventors: Herbert Peiffer, Mainz (DE); Martin Jesberger, Mainz (DE); Stefan Bartsch, Bodenheim (DE); Tobias Rentzsch, Bad Homburg (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 0 days.

(21) Appl. No.: 16/445,348

(22) Filed: Jun. 19, 2019

(65) Prior Publication Data
US 2019/0389187 A1   Dec. 26, 2019

(30) Foreign Application Priority Data

Jun. 20, 2018 (DE) .......... 10 2018 210 041
Dec. 7, 2018 (DE) .......... 10 2018 221 222

(51) Int. Cl.
| | | |
|---|---|---|
| *B32B 27/36* | (2006.01) | |
| *B32B 27/08* | (2006.01) | |
| *B29C 48/00* | (2019.01) | |
| *B29C 48/21* | (2019.01) | |
| *B65D 81/34* | (2006.01) | |
| *B29K 67/00* | (2006.01) | |
| *B29L 9/00* | (2006.01) | |

(52) U.S. Cl.
CPC .......... *B32B 27/36* (2013.01); *B29C 48/0018* (2019.02); *B29C 48/022* (2019.02); *B29C 48/21* (2019.02); *B32B 27/08* (2013.01); *B65D 81/343* (2013.01); *B29K 2067/00* (2013.01); *B29L 2009/00* (2013.01); *B32B 2307/518* (2013.01); *B32B 2439/70* (2013.01); *B65D 2581/3418* (2013.01); *B65D 2581/3424* (2013.01)

(58) Field of Classification Search
CPC ... B32B 27/36; B32B 27/08; B32B 2307/518; B32B 2439/70; B29C 48/022; B29C 48/21; B29C 48/0018; B29K 2067/00; B65D 81/343; B65D 2581/3424; B65D 2581/3418

See application file for complete search history.

(56) References Cited

FOREIGN PATENT DOCUMENTS

| | | |
|---|---|---|
| EP | 0 415 383 | 3/1991 |
| EP | 2 810 776 A1 | 12/2014 |
| EP | 1 697 129 B1 | 11/2015 |
| EP | 1 945 512 B1 | 6/2016 |
| EP | 1 475 228 B1 | 7/2017 |

*Primary Examiner* — Michael C Miggins
(74) *Attorney, Agent, or Firm* — ProPat, LLC; Cathy R. Moore (57) ABSTRACT

The present invention relates to a transparent packaging for vacuum forming including a specific biaxially oriented thermoformable polyester foil as lower foil (A) and a specific biaxially oriented polyester foil as upper foil (B) that can be heat-sealed to the lower foil (A), and to a process for the production of such packing, and also use thereof.

13 Claims, 1 Drawing Sheet

THERMOFORMABLE TRANSPARENT PACKING MADE OF POLYESTER WITH A LOWER FOIL AND AN UPPER FOIL, PROCESS FOR PRODUCTION THEREOF AND USE THEREOF

CROSS-REFERENCE TO RELATED APPLICATIONS

This application claims priority to German Patent Application 10 2018 210 041.1 filed Jun. 20, 2018, and German Patent Application 10 2018 221 222.8 filed Dec. 7, 2018, both of which are hereby incorporated herein by reference in their entirety.

FIELD OF THE INVENTION

The invention relates to a transparent packing comprising a biaxially oriented thermoformable polyester foil as lower foil and a biaxially oriented sealable polyester foil as upper foil. The thermoformable lower foil serves to hold food, e.g. meat, fish or poultry. The upper foil serves to cover the lower foil, and is securely sealed to the latter by means of heat. The pack has a self-venting/opening feature and can therefore by way of example be used (cooked) in an oven, in a microwave or in a contact grill at high temperature. The invention moreover relates to a process for the production of the packing and to use thereof.

BACKGROUND OF THE INVENTION

In particular for meat, fish, poultry and dry (ready-to-eat) products such as sandwiches, burgers or wraps, transparent ready-meal trays are used which are made of thermoformable polyester, for example a-PET or modified boPET, are produced with use of vacuum and, after filling with food, are closed by a foil heat-sealed onto the perimeter of the ready-meal tray. Provision of the products in such packaging is regarded as clean and hygienic, and is therefore very popular. Vacuum processes, e.g. using Multivac machines, is a cost-effective method of producing hygienic packing for meat, fish or poultry. The finished packing is generally produced here as follows: A roll of the foil for producing the ready-meal tray—also termed lower foil—is clamped into the front region of the machine. By way of one or more vacuum chambers, the foil is thermoformed to a desired depth by use of heat and vacuum. According to the prior art (see, for example, EP 1 697 129 B1), depths up to about 70 mm can be achieved, for example when laminates made of polyester and polyamide are used. After thermoforming, the food product is placed into the ready-meal tray, mostly by hand. By way of a further roll, the lid foil or upper foil is introduced to the ready-meal tray and securely sealed to its perimeter, with use of heat and pressure. This step mostly again takes place under vacuum, which is applied to the entire packing. This is followed by separation into individual packs and other associated separate downstream operations, for example the printing or labelling of the packaging.

The packs are frozen and passed onwards for sale. The consumer defrosts the pack and cooks the same in an oven at temperatures up to 220° C. for a defined time (about 30 min to two hours). To this end, the pack is placed, closed, into the preheated oven (cook-in), where it automatically opens at the seal seam—ideally after from 5 to 10 min (the term used for this being self-venting).

Self-venting is an essential feature in the development of new packs with improved functionality or with modified design. The automatic opening of the seal seam, in essence as a consequence of the increased pressure of steam in the pack, allows the steam to escape from the pack, and the product becomes crisp and brown—as desired by the consumer. Once the cooking time has expired, the upper foil is peeled—while retaining its integrity—from the ready-meal tray while it is still hot, and the contents of the pack are available for consumption.

The pack of the invention, produced from the two foils, exhibits the desired self-venting during cooking. Self-venting is achieved when the sealing properties of the upper foil have been adjusted appropriately for the lower foil.

The market places stringent optical requirements on the two foils of the pack, in particular on haze, clarity and gloss. For good discernibility of the contents of the pack (size of the food), the haze of the pack should be <5% and the clarity of the pack >85%. The pack is moreover intended to be visually attractive. To this end, high gloss values of the pack are desirable.

High puncture resistance is also demanded from the pack, in order that it can be transported without damage.

Packs made of thermoformable lower film and (sealable) upper film are known.

EP 1 697 129 B1 describes a thermoformable foil laminate which comprises a thermoformable foil layer (a), a structural foil layer (b), a heat-sealable layer (c) and optionally a barrier layer (d). The structural foil layer (b) is adjacent to the first surface of the thermoformable foil layer (a), and the heat-sealable layer (c) is on the opposite, second surface directed towards the internal side of the pack. The thermoformable foil layer (a) comprises a polymer composition comprising at least 80% by weight of polyethylene terephthalate. The structural foil layer (b) can comprise a large number of polymers, and preferably comprises a polyamide. The heat-sealable layer (c) can likewise comprise a large number of different polymers, and preferably comprises an amorphous polyester. The laminate is suitable for the application mentioned in the introduction, but requires improvement in thermoformability and puncture resistance, and especially requires improvement in optical properties such as haze, clarity and gloss.

EP 1 945 512 B1 describes a process for the packaging of fish or meat which in essence comprises the steps mentioned in the introduction of the present application: (i) provision of a thermoformable polymeric holder film (=lower foil) and of a polymeric cover film (=upper foil). The holder film consists of a single-layer polyester substrate or polyamide substrate, and the cover film is preferably comprised of polyester polymers. At least one of the two surfaces of the holder film and of the cover film is heat-sealable. (ii) Provision of an elevated exterior portion and of a lowered central portion in the holder film via thermoforming. (iii) Arrangement of a portion of meat or fish on the interior (=first) surface of the holder film. (iv) Arrangement of the cover film over the portion of meat or fish, so that the interior (=first) surface of the cover film faces towards the interior surface of the holder film. (v) Bringing the perimeters of the first surface of the holder film and of the first surface of the cover film into contact and formation of a heat-seal bond therebetween, and (vi) optionally freezing of the packaged meat or fish. The process is suitable for the application mentioned in the introduction; however, the foils described in more detail in EP 1 945 512 B1 require improvement in thermoformability and puncture resistance, and especially require improvement in optical properties (haze, clarity and gloss).

Another example is provided by EP 0 415 383, which describes the use of a polyester foil with a melting point from 210 to 245° C., with planar orientation of from 0.10 to 0.16, with shrinkage smaller than or equal to 10% and with density below 1.385 g/cm³. The foil features good formability and good adhesion to metal and is intended for use by way of example in lamination to metal containers. The process is suitable for the use mentioned in the introduction; however, the foils described in EP 0 415 383 require improvement in optical properties (haze, gloss and clarity).

SUMMARY OF ADVANTAGEOUS EMBODIMENTS OF THE INVENTION

It was an object of the present invention to provide, for the application mentioned in the introduction, polyester packaging which features good thermoformability of the lower foil and excellent sealing properties of the upper foil with respect to the lower foil. The pack is moreover intended to have good self-venting properties and to exhibit particularly excellent optical properties. It is intended to overcome the disadvantages of foils of the prior art and in particular to feature the following aspects/properties:

The lower foil of the packaging is intended to have thermoformability sufficiently good to permit problem-free use thereof for packing, in the desired packaging design, of commercially available cuts of meat, poultry or fish, or dry products such as sandwiches. The lower foil is intended to be amenable to thermoforming up to a depth of 70 mm, in line with the requirements of the market.

A further intention is that the two foils also have very good mechanical properties, but in particular that the lower foil has the said properties. For the present application, the particularly important mechanical property of the lower foil is puncture resistance. It is intended to be sufficiently easy to avoid damage to the pack during transport and storage thereof.

Sealing of the pack between lower foil and upper foil is intended to be such that it withstands inter alia pre-cooking in a waterbath (waterbath temperature up to 85° C., residence time of pack in waterbath up to 6 hours), with no resultant opening of the seal seams.

The pack is intended to self-vent during the cooking process, e.g. in a conventional oven with oven temperature up to 220° C., where self-venting ideally is intended to occur after about 5 to 15 min in the oven.

The pack is intended to feature excellent optical properties. This relates to haze, and in particular to the clarity of the two foils of the pack. It is desirable that the haze of the two foils is below 5% and that the clarity thereof is above 85%. The customer's wish is by way of example to be able to see the contents of the pack clearly and in detail during purchase of the product. The pack is moreover intended to be visually attractive by virtue of maximized gloss.

A further requirement is that the pack withstands the cooking procedure without any white clouding, for example due to crystallization of the foils during the cooking procedure.

The pack is moreover intended to have good barrier properties, in particular with respect to oxygen and water vapour. The transmission rate values of conventional biaxially oriented PET foils produced according to the prior art serve for comparison (see for example http://www.bfr.bund.de/cm/343/barrierewirkung-aus-gewaehlter-kunststoffmaterialien-gegen-die-migration-von-mineraloelfraktionen-in-lebensmittel.pdf), which are not to be exceeded, or are to be exceeded only marginally (<5%). The transmission rate values of PET foils of thickness 100 μm are: OTR=10 cm³/(m² d bar) and WVTR=2 g/(m² d).

The two foils of the pack, which are highly transparent and therefore have low fill levels (for concentration of antiblocking agent, see text at a later stage below) are intended to be amenable to very successful winding and to successful processing. The individual film laps are not permitted to adhere to one another during winding and unwinding of the foils, even at elevated temperature, e.g. 50 or 60° C. Any increase in adhesion between the individual film laps would make unwinding of the foils more difficult or even impossible.

The pack is intended to be amenable to cost-effective production. This means by way of example that conventional industrial processes can be used for the production of lower and upper film.

DETAILED DESCRIPTION OF ADVANTAGEOUS EMBODIMENTS OF THE INVENTION

The object is achieved via the provision of a transparent packaging for vacuum forming, comprising a biaxially oriented thermoformable polyester foil as lower foil (A) and a biaxially oriented polyester foil as upper foil (B) which can be heat-sealed to the lower foil (A),
where I the lower foil (A) is a foil comprising at least 85% by weight of a copolyester having dicarboxylic acid components of which from 85 to 94 mol % are terephthalic-acid-derived units and from 6 to 15 mol % are isophthalic-acid-derived units, where the foil has the following:
a) area modulus of elasticity in the range from 4500 to 6400 N/mm²
b) total of strength values ($\sigma_5$ value) in longitudinal direction and in transverse direction in the range from 170 to 220 MPa
c) a density below 1390 kg/m³
d) haze below 2.0% and clarity at least 85% and
e) thickness in the range from 50 to 300 μm.

II The upper foil (B) is a foil comprising a base layer (B") and an outer layer (B') which can be heat-sealed with respect to lower foil (A), where the heat-sealable outer layer (B') comprises at least 90% by weight of a thermoplastic polyester comprised of
a) from 85 to 97% by weight of amorphous polyester I and
b) from 3 to 15% by weight of semicrystalline polyester II,
c) the heat-sealable outer layer (B') comprises from 0.04 to 0.35% by weight of inorganic and/or organic particles with median diameter $d_{50}$ from 1.5 to 5.0 μm, where the ratio of particle size $d_{50}$ to layer thickness over the outer layer (B') is greater than 1.0,
d) the thickness of the outer layer (B') is from 1.5 to 4.0 μm,
e) the haze of the upper foil is below 5.0% and its clarity is at least 85%, f) its seal seam strength with respect to itself (=thin sealing) and with respect to the lower foil (A) is in the range from 2 to 7 N/15 mm and g) its thickness is in the range from 20 to 125 μm.

Unless otherwise mentioned, the expression % by weight hereinbefore and hereinafter is always based on the mass of the respective layer or on the respective system in connection with which the data is mentioned. Also, as used herein the term "foil" and "film" are interchangeable.

(I) Lower Foil (A)=Thermoformable Polyester Foil

The pack according to the present invention comprises a thermoformable lower foil (A) which is formed by a transparent biaxially oriented single-layer polyester foil (A) or by a transparent biaxially oriented multilayer coextruded polyester foil, e.g. (A', A", A''').

The lower foil (A) comprises at least 85% by weight of a thermoplastic copolyester. According to the invention, this is a copolyester having dicarboxylic acid components of which from 85 to 94 mol % are terephthalic-acid-derived units and from 6 to 15 mol % are isophthalic-acid-derived units. It is preferable that this is a foil comprised of a copolyester having dicarboxylic acid components of which from 86 to 93 mol % are terephthalic-acid-derived units and from 7 to 14 mol % are isophthalic-acid-derived units. According to the invention, preferably suitable diol in the thermoplastic copolyester is ethylene glycol.

From 0 to 15% by weight of the lower foil (A) can be comprised of other polymers/polymer fractions and/or of other substances, where the other polymer/polymer fractions derive from other aromatic and/or aliphatic dicarboxylic acids and, respectively, diols. Mixtures or blends made of the homo- and/or copolymers mentioned can also be used advantageously for the thermoplastic polyester of the lower foil (A).

Suitable other aromatic dicarboxylic acids are preferably terephthalic acid, furan-2,5-dicarboxylic acid (FDCA), biphenyl-4,4'-dicarboxylic acid, naphthalenedicarboxylic acids (for example naphthalene-1,4- or -1,6-dicarboxylic acid or naphthalene-2,6-dicarboxylic acid), biphenyl-x,x'-dicarboxylic acids (in particular biphenyl-4,4'-dicarboxylic acid), diphenylacetylene-x,x'-dicarboxylic acids (in particular diphenylacetylene-4,4'-dicarboxylic acid) or stilbene-x,x'-dicarboxylic acids. Among the cycloaliphatic dicarboxylic acids, mention may be made of cyclohexanedicarboxylic acids (in particular cyclohexane-1,4-dicarboxylic acid). Among the aliphatic dicarboxylic acids, the ($C_3$-$C_{19}$) alkanediacids are particularly suitable, where the alkane moiety can be straight-chain or branched.

Examples of suitable other aliphatic diols are diethylene glycol, triethylene glycol, aliphatic glycols of the general formula HO—$(CH_2)_n$—OH, where n is an integer from 3 to 6 (in particular propane-1,3-diol, butane-1,4-diol, pentane-1,5-diol and hexane-1,6-diol) and branched aliphatic glycols having up to 6 carbon atoms, and cycloaliphatic, optionally heteroatom-containing diols having one or more rings. Among the cycloaliphatic diols, mention may be made of cyclohexanediols (in particular cyclohexane-1,4-diol). Suitable other aromatic diols by way of example have the formula HO—$C_6H_4$—X—$C_6H_4$—OH, where X is —$CH_2$—, —$C(CH_3)_2$—, —$C(CF_3)_2$—, —O—, —S— or —$SO_2$—.

The desired good mechanical properties, and in particular the desired good thermoformability of the biaxially oriented polyester foil, are obtained via the choice of proportions of terephthalic-acid-derived units and isophthalic-acid-derived units according to the invention. If the proportion of the dicarboxylic acid components that are isophthalic-acid-derived units is less than 6 mol-%, it is impossible to obtain the desired good thermoformability of the foil. If, on the other hand, this proportion is more than 15 Mol-%, reliable production of the lower foil (A) in the process described hereinafter becomes impossible. Foils made of such high proportions of components which are isophthalic-acid-derived units are by way of example highly susceptible, during the production process, to sticking to themselves or to relevant machine components, e.g. rolls during longitudinal stretching, or rolls in the outgoing end of the machine after transverse stretching.

The polyesters can be produced by the transesterification process. This starts from dicarboxylic esters and diols, which are reacted with the usual transesterification catalysts, for example salts of zinc, of calcium, of lithium and of manganese. The intermediate products are polycondensed in the presence of well-known polycondensation catalysts, for example antimony trioxide, titanium oxide, or else germanium compounds. They can be produced equally well by the direct esterification process in the presence of polycondensation catalysts. These proceed directly from the dicarboxylic acids and the diols.

It has proved to be particularly advantageous to polycondense the intermediate products in the presence of titanium dioxide or germanium compounds, or to carry out the direct esterification process in the presence of polycondensation catalysts such as titanium dioxide or germanium compounds. The biaxially oriented polyester foil is then antimony-free. The term antimony-free means for the purposes of the invention antimony content 20 ppm; (antimony content 20 ppm can be accepted in the polyester, because antimony-free materials are mostly produced in reactors in which antimony-containing/antimony-trioxide-catalyzed materials are produced; it is therefore not always possible to achieve complete exclusion of ubiquitous traces of antimony). In the particularly preferred case, a desirable biaxially oriented polyester foil comprises no antimony and can therefore be used in packaging applications where the foil is in direct contact with food.

The foil of the present invention is characterized by area modulus of elasticity in the range from 4500 to 6400 N/mm² in accordance with the following formula:

$$E_{area} = \sqrt{(E_{MD}^2 + E_{TD}^2)}$$

$E_{MD}$ is the modulus of elasticity of the foil measured in longitudinal direction of the machine, and $E_{TD}$ is the modulus of elasticity of the foil measured in transverse direction of the machine. This property is in essence achieved via compliance with the production procedure described below of the invention in conjunction with the polyesters described above of the invention. Surprisingly, it has been found that if the area modulus is below 4500 N/mm² the foil no longer has the desired mechanical properties and is therefore unsuitable for the application mentioned. By way of example, because of the excessively low area modulus of elasticity it then becomes impossible to achieve useful winding of the foil; undesirable creases arise. It has moreover been found for the purposes of the present invention that, on the other hand, if the area modulus is above 6400 N/mm² it becomes impossible to achieve thermoforming of the foil as required by the object of the invention.

The foil of the present invention is moreover characterized by the total of the strength values ($\sigma_5$ value) in longitudinal direction (MD) and in transverse direction (TD) in the range from 170 to 220 MPa. Again, this property is in essence achieved through compliance with the production procedure described below of the invention in conjunction with the polyesters described above of the invention. If the total of the strength values is below 170 MPa, the foil no longer has the desired mechanical properties and is therefore unsuitable for the application. By way of example, because the total of the strength values is too small, it is no longer possible to achieve useful transportation of the foil in the thermoforming machine; the foil undergoes undesirable distortion. If, on the other hand, the total of the strength values is above 220 MPa, it becomes impossible to thermoform the foil as required by the object of the invention.

The foil of the present invention is moreover characterized by a density below 1390 kg/m$^3$. Again, this property is in essence achieved through compliance with the production procedure described below of the invention in conjunction with the polyesters described above of the invention. If the density of the foil is above 1390 kg/m$^3$, the foil is surprisingly too crystalline to be thermoformed as required by the object of the invention.

In order to achieve the desired good mechanical properties, and in particular in order to achieve the desired good thermoformability, it is necessary that the SV value of the lower foil (A) is within a certain range. The SV value of the lower foil (A) according to the invention is in the range from 680 to 1000, preferably in the range from 710 to 950, with particular preference in the range from 740 to 900. The rule here is that the SV values of the respective polymer melts (base layers and outer layers) should differ by no more than 100 units, preferably no more than 75 units, and in particular no more than 50 units.

If the SV value of the foil is below 680, it is impossible to achieve the required good thermoformability of the foil providing about 70 mm draw depth. If, on the other hand, the SV value is above 1000, the polyester is too viscous, and by way of example is no longer amenable to cost-effective extrusion.

In order moreover to improve the processing behaviour of the foil it is advantageous to incorporate particles into the lower foil (A). It has proved to be advantageous here to comply with the following conditions:

a) The median diameter $d_{50}$ of the particles is to be from 1.5 to 5.0 µm. It has proved to be particularly advantageous to use particles with $d_{50}$ from 1.7 to 4.5 µm and particularly preferably from 2.0 to 4.0 µm.
b) The concentration of the particles in the lower foil is to be from 0 to 0.1% by weight (1000 ppm). It is preferable that the concentration of the particles in the foil is from 1.0×10$^{-5}$ to 0.075% by weight, and particularly from 1.1×10$^{-5}$ to 0.05% by weight.

If particles with diameter $d_{50}$ below 1.5 µm are used, there is no favorable effect of the particles by way of example on the winding of the foil. The foil is then by way of example susceptible to undesirable tearing or tear-propagation during unwinding. Particles with diameter $d_{50}$ above 5.0 µm generally cause problems during the stretching of the foil; vacuoles adversely affecting the haze of the foil are increasingly formed. If the lower foil (A) comprises particles at a concentration of more than 0.1% by weight, the haze of the foil is no longer within the range of the invention.

Conventional antiblocking agents are inorganic and/or organic particles, for example calcium carbonate, amorphous silica, talc, magnesium carbonate, barium carbonate, calcium sulphate, barium sulphate, lithium phosphate, calcium phosphate, magnesium phosphate, aluminium oxide, the calcium, barium, zinc or manganese salts of the dicarboxylic acids used in the lower foil (A), titanium dioxide, kaolin, or crosslinked polystyrene particles, or crosslinked polymer particles based on acrylic acid derivatives.

Particles preferred according to the invention are synthetically produced amorphous SiO$_2$ particles in colloidal form. Excellent binding of the particles into the polymer matrix is achieved, and the particles produce only a small number of vacuoles.

In what is known as the cook-in method (in this connection see EP 1 697 129 or EP 2810776 A1) the closed pack is placed into the oven and removed from the oven after a defined cooking time. The cooking time in essence depends on the pack size (mass of the contents), and is generally from 30 min to two (2) hours.

A large portion of the area of the thermoformable foil experiences only a low level of thermal stress as a result of this procedure. A significantly higher level of thermal stress is experienced by the foil only in the peripheral region of the pack, and within that region in particular at the corners of the pack (sealed edge). The corner region of the pack is exposed to the oven temperature for the entire cooking time, whereas by virtue of the evaporating water the remaining portion of the thermoformed foil experiences temperatures significantly below 160° C.

In extreme cases here, the foil in the corner region experiences thermal stress for more than 2 h at a temperature of 220° C.; at this elevated temperature oxygen can penetrate into the polymer.

It is certainly possible that as a consequence of the above the pack, and therefore the foil, in particular in the corners, begins to become brittle and is susceptible to splintering. This is extremely undesirable and must be avoided.

If increased thermal stability is required for this application sector, the foil—made of polyester that is preferably antimony-free—preferably comprises one or more free-radical scavengers. This/these free-radical scavenger(s) is/are preferably based on phenolic antioxidants.

Surprisingly, it has been found that the foil comprising one or more free-radical scavengers has significantly increased heat resistance, therefore allowing packaging produced therefrom to remain for more than an hour in an oven at temperatures above 220° C. with no resultant embrittlement.

In a preferred embodiment, the foil of the present invention comprises from 500 to 3000 ppm of a free-radical scavenger, the content preferably being from 600 to 2500 ppm and with particular preference from 700 to 2000 ppm. Contents below 500 ppm tend to lead to failure in the oven (=splintering), and contents above 3000 ppm have no further improving effect on the foil and therefore merely reduce cost-effectiveness, and can lead to migration of the stabilizer out of the foil into a packaged food. Contents above 3000 ppm moreover tend to lead to formation of gels and to an undesired yellow tinge in the foil.

Free-radical scavengers used can be either one compound or a mixture of various free-radical scavengers, preference being given to use of one compound as free-radical scavenger. The free-radical scavenger(s) used is/are preferably selected from the group of the phenolic antioxidants.

Preferred free-radical scavengers are pentaerythritol tetrakis[3-(3,5-di-tert-butyl-4-hydroxyphenyl)propionate] (CAS No. 6683-19-8) and 1,3,5-trimethyl-2,4,6-tris(3,5-di-tert-butyl-4-hydroxybenzyl)benzene) (CAS No. 1709-70-2), obtainable with trade names IRGANOX® 1010 and IRGANOX® 1330 from BASF.

The effectiveness of the free-radical scavenger can be tested directly on the packaging, e.g. after removal of the packaging from the oven. The packaging is classified as good here (=suitable for the application) if no splintering is observed at any point on the foil of the present invention.

The lower foil (A) can be comprised of one or more layers (i.e. at least two layers). In order to achieve the abovementioned properties, in particular the required good optical properties of the polyester foil, a single-layer structure of the foil has been found to be advantageous. However, a two- or three-layer structure of the lower foil (A) made of two layers A' and A" or three layers A' A"A' or A'A"A''' has also proved to be suitable. The quantity of particles in the base layer A" of a, for example, three-layer foil here should be smaller than in the two layers A' (and A'''), which are preferably identical in respect of structure, or else can be different.

The concentration of particles in the layer (A") here should be selected in a manner such that they have a favourable effect on the haze and gloss of the foil. In the case of a three-layer foil of the type mentioned, the concentration of particles in the layer (A") is from 0 to 0.08% by weight, preferably from 0 to 0.05% by weight and in particular from 0 to 0.02% by weight. The diameter of the particles used particularly preferably has $d_{50}$ above 1.5 µm.

During selection of the concentration of particles in the outer layers (A' or A''') and in the base layer (A"), care must be taken to avoid exceeding the value according to the invention of 0.1% by weight for the concentration of particles in the entire foil.

The thickness of the two layers A' (or A' and A''') can be identical or different. Their thicknesses are generally from 0.2 to 5 µm. The lower foil (A) can moreover additionally comprise conventional additives, for example stabilizers (UV, hydrolysis), but in particular heat stabilizers (e.g. IRGANOX® 1010) or other fillers (e.g. color pigments), in the concentrations recommended by the manufacturer. The juncture at which these are advantageously added to the polymer or to the polymer mixture is prior to melting in the extruder.

The total thickness of the polyester foil (A) of the invention can vary within certain limits. It is from 50 to 300 µm, preferably from 51 to 300 µm and particularly preferably from 52 to 300 µm. If the thickness of the foil (A) is below 50 µm, the mechanical properties and barrier properties of the thermoformed foil are inadequate. In contrast, if the thickness of the foil (A) is above 300 µm, the thermoformability of the foil becomes poorer, and moreover production of the foil becomes uneconomical, both of these situations being undesirable.

The present invention likewise provides a process for the production of the thermoformable lower foil (A). It comprises the production of the lower foil by extrusion (production of layer (A)) or coextrusion (e.g. production of the layers (A', A", A''')), biaxial stretching of the lower foil (A), and heat setting and winding of the stretched lower foil (A).

In the case of the coextrusion process, after extrusion of the respective melts in separate extruders these are shaped in a coextrusion die to give flat melt films and laminated on one another. The multilayer film is then taken off and solidified with the aid of a chill roll and optionally other rolls. For the mixing of the various components it has proved advantageous here to use a twin-screw extruder with vent(s) to extrude the polymers for the layer (A) or layers (A'A"A'''). A foil is thus produced that has fully satisfactory optical properties, e.g. no clouding or streaking.

The biaxial stretching of the foil is carried out sequentially. The sequential stretching preferably begins with stretching in the longitudinal direction, followed by stretching in transverse direction. The stretching in the longitudinal direction can be achieved by way of example with the aid of two rolls rotating at different speeds corresponding to the desired stretching ratio. For the transverse stretching, an appropriate tenter frame is generally used.

The temperatures at which the biaxial stretching is carried out can vary within certain ranges, which in essence depend on the desired properties of the foil of the invention, in particular the desired thermoforming properties. Surprisingly, it has been found here that in order to achieve the desired thermoformability it is necessary to stretch the foil to a smaller extent than is conventional in the prior art.

In order to achieve the desired thermoformability of the foil, the stretching in longitudinal direction is carried out under defined conditions. The temperature of the foil during stretching is in the range from 70 to 100° C.; (the heating temperatures of the rolls are from 60 to 110° C.). The longitudinal stretching ratio is in the range from 2.2:1 to 3.8:1, preferably in the range from 2.3:1 to 3.6:1 and particularly preferably in the range from 2.4:1 to 3.4:1. If the stretching ratio of the foil is below 2.2:1, by way of example the thickness profile is poor; if the stretching ratio of the foil is above 3.8:1, thermoformability becomes inadequate.

After longitudinal stretching, transverse stretching takes place in an appropriate tenter frame. The temperatures of the heating fields in the tenter frame are from 70 to 120° C. (film temperature: from 60 to 110° C.). The stretching in transverse direction is carried out in the foil temperature range from 90° C. (start of stretching) to 140° C. (end of stretching). The transverse stretching ratio according to the invention is in the range from 2.2:1 to 3.8:1, preferably from 2.4:1 to 3.7:1 and particularly preferably in the range from 2.6:1 to 3.6:1. If the stretching ratio of the foil is below 2.2:1, by way of example the thickness profile is poor; if the stretching ratio of the foil is above 3.8:1, thermoformability becomes inadequate.

The biaxial orientation is followed by heat setting of the foil. Surprisingly, it has been found that in order to achieve the abovementioned desired good thermoformability of the foil it is necessary to carry out heat setting under defined conditions of the invention. According to the invention, the duration of heat setting is from 5 to 25 s, preferably from 6 to 22 s and particularly preferably from 7 to 20 s. According to the invention, the temperature at which the heat setting is carried out is in the range from 175 to 220° C., preferably in the range from 178 to 215° C. and particularly preferably in the range from 180 to 210° C.

After heat setting, the foil is cooled, and is wound in a conventional manner.

Compliance with the abovementioned process conditions is important for the production of the lower foil (A) of the invention. If compliance with the process conditions mentioned of the invention is not achieved during longitudinal and transverse stretching and in the setting of the lower foil (A), it is impossible to achieve the mechanical properties of the invention for the foil, and in particular impossible to achieve the desired thermoformability and puncture resistance; this is undesirable.

In order to improve the windability of the transparent foil with low filler level, in a preferred embodiment at least one surface of the lower foil (A) is coated in-line or off-line with a further layer (C) which comprises alkyl polyacrylate and/or alkyl polymethacrylate and/or alkyl polyacrylate-co-methacrylate. Acrylic and/or methacrylic copolyesters that bring about crosslinking of the polymers can moreover be present. It is preferable here to use N-methylolacrylamide for the production of the copolymers. Other crosslinking agents, for example melamine, can moreover also be used. The coating is preferably applied in-line.

The coating (C) of the present invention is described in detail in EPA 0 144 948, which is expressly incorporated here by way of reference.

The preferred acrylate coating is applied at least to one side of the lower foil (A), and serves in essence to improve winding, and in particular to improve the unwinding of the foil after storage (at elevated temperatures). The coating formulation can comprise known additions, e.g. antistatic agents, wetting agents, surfactants, pH regulators, antioxidants, dye pigments, and antiblocking agents, for example colloidal $SiO_2$, etc. It is normally advisable to incorporate a surfactant in order to achieve a further increase of the capability of the aqueous coating to wet the polyester substrate foil, and in order to stabilize the particles made of copolymers of acrylic/methacrylic acid.

Coating of the lower foil (A) with the acrylic-crosslinking layer (C) takes place either in-line, preferably between the first and second stretching step, or off-line after production of the biaxially oriented foil.

In the case of in-line coating, which is preferably used, one or both surfaces of the lower foil (A) is/are coated with a layer (C) before transverse stretching. In the case of off-line coating, the layer (C) is preferably applied after production of the lower foil (A).

The manner in which a functional coating is applied to the polyester foil is such that the thickness of the coating on the finished polyester foil is preferably from 5 to 100 nm, particularly preferably from 10 to 90 nm and very particularly preferably from 15 to 80 nm. Particular preference is given to application of the layer (C) by means of the reverse gravure-roll coating process, in which the coating can be applied extremely homogeneously in layer thicknesses up to 200 nm. The coating is preferably applied in the form of solution, suspension or dispersion, particularly preferably in the form of aqueous solution, suspension or dispersion.

The substances mentioned are applied in the form of dilute aqueous solution or dispersion to one of the two foil surfaces, and the solvent is then evaporated. If the coating is applied in-line prior to transverse stretching, the heat treatment during transverse stretching and subsequent heat setting is sufficient to evaporate the solvent and dry the coating.

Inventive Properties of the Lower Foil (A)

The lower foil (A) of the invention, produced by processes described above of the invention, has a large number of properties of which the most important are listed below.

The lower foil (A) of the invention features very good mechanical properties (e.g. area modulus of elasticity, total of strength values), which inter alia permit achievement of the desired good thermoformability and the desired good puncture resistance.

The lower foil (A) features excellent optical properties. The haze of the lower foil (A) is below 2.0%, preferably below 1.5% and particularly preferably below 1.0%. The clarity of the lower foil is above 85%, preferably above 90% and particularly preferably above 95%. The gloss of the lower film is above 140, preferably above 160 and particularly preferably above 180.

The puncture resistance F[N] of the foil which is important for the application is surprisingly sufficiently high that the thermoformed pack produced therefrom remains undamaged during transport and storage. According to the invention, the puncture resistance F of the lower foil (A) in the defined thickness range is correlated with the thickness d of the foil in accordance with the following formula $$\frac{F[N]}{d[\mu m]} > 0.35$$

It is preferable that F/d is above 0.37, and F/d is particularly preferably above 0.38.

The thermoformability of the lower foil (A) extends to at least 70 mm, with a thermoforming ratio of at least 2.5. Thermoformability preferably extends beyond 73 mm and particularly preferably extends beyond 76 mm. The thermoforming ratio is preferably above 2.6 and particularly preferably above 2.7.

Trays having this thermoformability of the invention can be used without difficulty in the conventional packaging design for packing of conventional commercial portions of meat, poultry or fish.

The lower foil (A) has the required good barrier properties, in particular with respect to oxygen, water vapour and various flavours.

The highly transparent lower foil (A) has good winding properties and good processing properties. When the foils are wound, the individual foil plies do not adhere to one another, even at elevated temperature, for example 50 or 60° C.

The thermoformable polyester foil of the invention has excellent suitability for the packaging of foods and other consumable items. It is particularly suitable for the packaging of foods and other consumable items in thermoformed ready-meal trays produced by the abovementioned process.

Table 1 collates inter alia the most important foil properties of the invention.

TABLE 1

| | Lower foil (A) | | | |
| --- | --- | --- | --- | --- |
| | Range of the Invention | Preferred | Particularly Preferred | Unit | Measurement Method |
| Proportion of Copolyester in Lower foil (A) | ≥85 | ≥86 | ≥87 | % by wt | |
| Proportion of Isophthalate Acid Units in Copolyester | 6-15 | 7-14 | 8-13 | mol % | |
| Concentration of filler | 0-0.1 | $1.0 \times 10^{-5}$-0.075 | $1.0 \times 10^{-5}$-0.05 | % by wt | |
| Particle diameter $d_{50}$ | 1.5-5 | 1.7-4.5 | 2.0-4.0 | μm | |

TABLE 1-continued

| | | Lower foil (A) | | | |
|---|---|---|---|---|---|
| | | Range of the Invention | Preferred | Particularly Preferred | Unit | Measurement Method |
| Process Technology | | | | | | |
| Longitudinal Stretching (T procedure) | Heating temperature of rolls | 60-110 | 65-105 | | °C. | |
| | Foil stretching temperature | 70-100 | 75-100 | | °C. | |
| | Longitudinal stretching ratio | 2.2-3.8 | 2.3-3.6 | 2.4-3.4 | | |
| Transverse stretching setting | Temperature of heating fields | 70-120 | | | °C. | |
| | Heating temperature of foil | 60-110 | | | °C. | |
| | Stretching temperature | 90-140 | | | °C. | |
| | Transverse stretching ratio | 2.2-3.8 | 2.4-3.7 | 2.6-3.6 | | |
| Heat Setting | Temperature | 175-220 | 178-215 | 180-210 | °C. | |
| | Duration | 5-25 | 6-22 | 7-20 | sec | |
| Foil Properties | | | | | | |
| Area modulus of elasticity | | 4500-6300 | 4600-6200 | 4700-6100 | N/mm² | ISO 527-1 and ISO 527-3; Sample Type 2 |
| Total of σ5 values | | 170-220 | 175-215 | 180-210 | N/mm² | ISO 527-1 and ISO 527-3; Sample Type 2 |
| Density | | <1390 | <1389 | <1388 | Kg/m³ | ASTM D1505-68, Method C |
| Haze of foil | | <2.0 | <1.5 | <1.0 | % | ASTM D 1003-61, Method A |
| Clarity of foil | | ≥85 | ≥90 | ≥95 | % | ASTM D 1003 |
| Gloss of foil | | ≥140 | ≥160 | ≥180 | N/15 mm | DIN 67530 |
| SV value of foil | | 680-1000 | 710-950 | 740-900 | | |
| Puncture resitance/foil thickness | | >0.35 | >0.37 | >0.38 | N/μm | EN 14447 |
| Thermoformability | Depth | ≥70 | ≥73 | ≥76 | mm | |
| | $A_{tray}/A_{foil}$ | ≥2.5 | ≥2.6 | ≥2.7 | | |
| Foil Thickness | | 50-300 | 51-300 | 52-300 | μm | |

(II) Upper Foil (B)=Sealable Polyester Foil

The packaging of the present invention moreover comprises an upper foil (B) which is formed by a transparent, biaxially oriented, coextruded and sealable polyester foil B") or (B', B", B"').

Outer Layer (B)

The sealable outer layer (B') of the upper foil (B) comprises at least 90% by weight of a polyester of the invention. The polyester of the invention comprises a proportion of from 85 to 97% by weight of an amorphous polyester I and a proportion of from 3 to 15% by weight of a semicrystalline polyester II. By virtue of the high proportion of polyester I, which comprises from 15 to 40 mol % of CHDM, the outer layer (B') is in essence amorphous, and therefore has good suitability as sealable layer for the intended application sector.

From 0 to 10% by weight of the outer layer (B') can be comprised of other polyesters and/or substances. The monomer units of the other polyesters here derive from other aliphatic, cycloaliphatic, aromatic diols and, respectively, dicarboxylic acids.

Examples of other aliphatic diols suitable for forming the other polyesters are diethylene glycol, triethylene glycol, aliphatic glycols of the general formula HO—$(CH_2)_n$—OH, where n is an integer from 3 to 6 (in particular propane-1,3-diol, butane-1,4-diol, pentane-1,5-diol and hexane-1,6-diol) and branched aliphatic glycols having up to 6 carbon atoms. Suitable other aromatic diols by way of example have the formula HO—$C_6H_4$—X—$C_6H_4$—OH, where X is —$CH_2$—, —$C(CH_3)_2$—, —$C(CF_3)_2$—, —O—, —S— or —$SO_2$—.

Other aromatic dicarboxylic acids of the other polyesters are preferably benzenedicarboxylic acids, naphthalenedicarboxylic acids, for example naphthalene-1,4- or -1,6-dicarboxylic acid, biphenyl-x,x'-dicarboxylic acids, in particular biphenyl-4,4'-dicarboxylic acid, diphenylacetylene-x,x'-dicarboxylic acids, in particular diphenylacetylene-4,4'-dicarboxylic acid, or stilbene-x,x'-dicarboxylic acids. Among the cycloaliphatic dicarboxylic acids, mention may be made of cyclohexanedicarboxylic acids, in particular cyclohexane-1,4-dicarboxylic acid. Among the aliphatic dicarboxylic acids, the ($C_3$ to $C_{19}$) alkanediacids are particularly suitable, where the alkane moiety can be straight-chain or branched.

The proportion of polyester I in the inventive polyester of the outer layer (B') is from 85 to 97% by weight. The proportion of the polyester I is preferably from 90 to 97% by weight and particularly preferably from 92 to 97% by weight. If the proportion of polyester I in the outer layer (B') is below 85% by weight, the sealing behaviour of the foil is impaired. If the proportion of polyester I in the outer layer (B') is more than 97% by weight, self-venting is impaired; this is undesirable. The foil moreover becomes more difficult to produce, because the tendency of the foil to adhere to certain machine components becomes particularly high.

Polyester I is in essence comprised of copolyesters comprised mainly of terephthalic acid units and of ethylene glycol units and 1,4-bishydroxymethylcyclohexane (=1,4-cyclohexanedimethanol (CHDM)) units. The preferred copolyesters are comprised of ethylene terephthalate units and 1,4-cyclohexanedimethylene terephthalate units. The proportion of ethylene terephthalate is from 60 to 85 mol %, and the corresponding proportion of cyclohexanedimethylene terephthalate is from 15 to 40 mol %. Preference is moreover given to copolyesters in which the proportion of ethylene terephthalate is from 62 to 80 mol % and the corresponding proportion of cyclohexanedimethylene terephthalate is from 20 to 38 mol %, and very great preference is given to copolyesters in which the proportion of ethylene terephthalate is from 65 to 80 mol % and the corresponding proportion of cyclohexanedimethylene terephthalate is from 20 to 35 mol %.

Polyesters I can moreover also comprise from 0 to 5 mol % of other monomer units, preferably cycloaliphatic diols, e.g. diethylene glycol or triethylene glycol, or in general terms aliphatic glycols of the general formula HO—$(CH_2)_n$—OH, where n is an integer from 3 to 6.

The proportion of polyester II in the outer layer (B') is from 3 to 15% by weight. In the preferred embodiment, the proportion of polyester II is from 3 to 10% by weight, and in the particularly preferred embodiment it is from 3 to 8% by weight. If the proportion of polyester II in the outer layer (B') is below 3% by weight, self-venting of the foil is impaired. Instead of large-area self-venting over defined regions of the packaging, tiny channels form along the length of the seal seam and impair self-venting; this is undesirable. If, on the other hand, the proportion of polyester II is above 15% by weight, sealability of the outer layer (B') becomes poorer; this is likewise undesirable.

Polyester II preferably consists of ethylene terephthalate or copolyester of ethylene terephthalate and ethylene isophthalate. Polyester II is generally based at least on the following dicarboxylates and alkylenes, based in each case on the total quantity of dicarboxylate and, respectively, total quantity of alkylene:

from 70 to 100 mol %, preferably from 72 to 98 mol % and particularly preferably from 74 to 95 mol %, of ethylene terephthalate from 0 to 30 mol %, preferably from 2 to 28 mol % and particularly preferably from 5 to 26 mol %, of isophthalate more than 50 mol %, preferably more than 65 mol % and particularly preferably more than 80 mol %, of ethylene units.

Any remaining fractions that may be present derive from other aromatic dicarboxylic acids and from other aliphatic diols, as listed by way of example as main and auxiliary carboxylic acids for the base layer (B").

Particular preference is given to copolyesters in which the proportion of terephthalate units is from 74 to 88 mol %, the corresponding proportion of isophthalate units is from 12 to 26 mol % (where the proportions of dicarboxylate give a total of 100 mol %), and the proportion of ethylene units is 100 mol %. The material is therefore polyethylene terephthalate/isophthalate.

It is preferable that the outer layer (B') is comprised of a physical mixture which is made of the polyesters I and II and which is produced in the feed system prior to extrusion. A mixture has the following advantages when comparison is made with use of only one polyester with comparable proportions of the components:

The mixture of the two polyesters I and II provides incompatibility in the layer. The surface of the outer layer (B') thus becomes rougher, and self-venting is thus improved.

In practical terms, the desired sealing properties can furthermore be achieved more effectively by using the mixture.

Addition of particles is easier in the case of polyester II than in the case of polyester I.

In order to achieve the desired good self-venting, and in particular in order to achieve good extrudability of the copolyesters, it is advantageous that the SV value of the amorphous polyester I is within a defined range. It has proved to be advantageous that the SV value of the polyester I is in the range from 680 to 900, preferably in the range from 710 to 880 and with particular preference in the range from 740 to 850. If the SV value is below 680 or above 900, it becomes impossible, by way of example, to achieve cost-effective extrusion of the material.

In order to achieve good self-venting of the heat-sealable outer layer (B') and good processability of the upper foil (B), and also in order to improve the behaviour of the upper foil (B) during peeling from the ready-meal tray (produced by thermoforming from lower foil (A)) after cooking, it is advantageous according to the invention to use suitable antiblocking agents (=particles) for further modification of the heat-sealable outer layer (B').

For good self-venting of the heat-sealable outer layer (B'), the diameter $d_{50}$ of the particles must lie within a range according to the invention. It has proved particularly advantageous here to use particles with median particle diameter $d_{50}$ from 1.5 to 5.0 μm, preferably from 1.5 to 4.5 μm and particularly preferably from 1.5 to 4.0 μm. When particles with diameter below 1.5 μm are used, there is no favourable effect of the particles on self-venting of the outer layer (B'). The foil then moreover is susceptible to tearing or tear propagation during peeling from the ready-meal tray after cooking; this is undesirable. Particles with diameter above 5.0 μm generally cause excessive haze and inadequate gloss of the foil, and also cause filter problems.

In order to provide the desired good self-venting and good winding and good processability of the foil, it has proved to be advantageous that the heat-sealable outer layer (B') comprises particles at a concentration of above 0.04% by weight, preferably above 0.05% by weight and particularly preferably above 0.06% by weight. The maximal concentration of the particles is 0.35% by weight, preferably 0.30% by weight and particularly preferably 0.25% by weight. If the outer layer (B') comprises particles at a concentration below 0.04% by weight, there is no longer any favourable effect on self-venting. If the outer layer (B') comprises particles at a concentration above 0.35% by weight, the haze of the foil becomes excessive.

In a preferred embodiment, the particle diameter $d_{50}$ in the heat-sealable outer layer (B') is greater than the thickness of the said layer. Compliance with a particle diameter/layer thickness ratio above 1.0, preferably above 1.1 and particularly preferably above 1.2, has proved to be advantageous according to the invention. In these cases there is a particularly favourable effect of the particles on self-venting and on the behaviour of the foil during peeling from the ready-meal tray after cooking.

Particles preferred according to the invention are synthetically produced amorphous $SiO_2$ particles in colloidal form. Excellent binding of the particles into the polymer matrix is achieved, and the particles produce only a small number of vacuoles. Vacuoles can by way of example arise during biaxial orientation of the foil; they generally increase haze, and should therefore be avoided for the present invention. Reference is made to the prior art for the production of the $SiO_2$ particles; the process is disclosed in detail by way of example in EP 1 475 228 B1.

Typical other particles used in the outer layer (B') are inorganic and/or organic particles, for example calcium carbonate, talc, magnesium carbonate, barium carbonate, calcium sulfate, barium sulfate, lithium phosphate, calcium phosphate, magnesium phosphate, aluminium oxide, LiF, the calcium, barium, zinc or manganese salts of the dicarboxylic acids used, titanium dioxide, kaolin or particulate polymers, e.g. crosslinked polystyrene particles or crosslinked acrylate particles.

The thickness of the heat-sealable outer layer (B') according to the invention is from 1.5 to 4 µm. If the thickness of the outer layer (B') is below 1.5 µm, sealing of the upper foil (B) to the lower foil (A) is inadequate. If the thickness of the outer layer is above 4 µm, self-venting of the pack becomes impaired; this is undesirable.

The outer layer (B') exhibits good sealing properties with respect to itself (thin sealing, outer layer (B') with respect to outer layer (B')), and in particular with respect to the lower foil (A). The seal seam strength of the outer layer (B') after sealing at 200° C. (460 N, 2 s), with respect to itself (thin sealing) and with respect to the lower foil (A) is above 2 N/15 mm and is up to 7 N/15 mm.

Base Layer (B")

The base layer (B") of the upper foil (B) consists of a thermoplastic polyester comprised of dicarboxylic units and of diol-derived units, or of dicarboxylates and of alkylenes, and generally comprises the following dicarboxylates and alkylenes, based in each case on the total quantity of dicarboxylate and, respectively, total quantity of alkylene:

more than 90 mol %, preferably more than 95 mol %, of terephthalate
more than 90 mol %, preferably more than 95 mol %, of ethylene.

Examples of other aliphatic diols suitable for forming the polyester are diethylene glycol, triethylene glycol, aliphatic glycols of the general formula HO—$(CH_2)_n$—OH, where n is an integer from 3 to 6 (in particular propane-1,3-diol, butane-1,4-diol, pentane-1,5-diol and hexane-1,6-diol) and branched aliphatic glycols having up to 6 carbon atoms. Suitable other aromatic diols by way of example have the formula HO—$C_6H_4$—X—$C_6H_4$—OH, where X is —$CH_2$—, —$C(CH_3)_2$—, —$C(CF_3)_2$—, —O—, —S— or —$SO_2$—.

Other aromatic dicarboxylic acids are preferably benzenedicarboxylic acids, naphthalenedicarboxylic acids, for example naphthalene-1,4- or -1,6-dicarboxylic acid, biphenyl-x,x'-dicarboxylic acids, in particular biphenyl-4,4'-dicarboxylic acid, diphenylacetylene-x,x'-dicarboxylic acids, in particular diphenylacetylene-4,4'-dicarboxylic acid, or stilbene-x,x'-dicarboxylic acids. Among the cycloaliphatic dicarboxylic acids, mention may be made of cyclohexanedicarboxylic acids, in particular cyclohexane-1,4-dicarboxylic acid. Among the aliphatic dicarboxylic acids, the ($C_3$ to $C_{19}$) alkanediacids are particularly suitable, where the alkane moiety can be straight-chain or branched.

The polyesters for the base layer (B") can by way of example be produced by the transesterification process. This starts from dicarboxylic esters and diols, which are reacted with the usual transesterification catalysts, for example salts of zinc, of calcium, of lithium and of manganese. The intermediate products are then polycondensed in the presence of well-known polycondensation catalysts, for example antimony trioxide or titanium, aluminium or germanium salts. They can equally well be produced by the direct esterification process in the presence of polycondensation catalysts. These proceed directly from the dicarboxylic acids and the diols.

It has proved to be particularly advantageous to polycondense the intermediate products in the presence of titanium dioxide or germanium compounds, or to carry out the direct esterification process in the presence of polycondensation catalysts such as titanium dioxide or germanium compounds. The biaxially oriented polyester foil is then antimony-free. In the particularly preferred case, a biaxially oriented polyester foil is desirable which comprises no antimony and which therefore can be used in packaging applications in which the foil is in direct contact with food.

The base layer (B") can additionally comprise conventional additives, for example stabilizers (UV, hydrolysis), but in particular heat stabilizers (e.g. Irganox 1010) or other fillers (e.g. color pigments), in the concentration recommended by the manufacturer. The juncture at which these are advantageously added to the polymer or to the polymer mixture is prior to melting in the extruder.

The base layer (B") additionally comprises regrind, a quantity of up to 60% by weight of which is introduced into the extrusion process during the production of the foil, without any significant resultant adverse effect on the physical, and in particular the optical, properties of the foil.

As described above in the case of the lower foil, the upper foil, too, is exposed to relatively high thermal stress during what is known as the cook-in process.

A large portion of the area of the foil experiences only a low level of thermal stress as a result of this procedure. A significantly higher level of thermal stress is experienced by the foil only in the peripheral region of the pack, and within that region in particular at the corners of the pack (sealed edge). The corner region of the pack is exposed to the oven temperature for the entire cooking time, whereas by virtue of the evaporating water the remaining portion of the thermoformed foil experiences temperatures significantly below 160° C.

In extreme cases here, the foil in the corner region experiences thermal stress for more than 2 h at a temperature of 220° C.; at this elevated temperature oxygen can penetrate into the polymer.

It is certainly possible that as a consequence of the above the pack, and therefore the foil, in particular in the corners, begins to become brittle and is susceptible to splintering. This is extremely undesirable and must be avoided.

As described for the foil (A), the base layer (B"), too, preferably comprises one or more free-radical scavengers when relatively high thermal stability is required. The free-radical scavenger(s) is/are preferably based on phenolic antioxidants.

Surprisingly, it has been found that the foil comprising one or more free-radical scavengers has significantly increased heat resistance, therefore allowing packaging produced therefrom to remain for more than an hour in an oven at temperatures above 220° C. with no resultant embrittlement.

In a preferred embodiment, the foil of the present invention comprises from 400 to 2000 ppm of a free-radical scavenger, the content preferably being from 500 to 2000 ppm and with particular preference from 600 to 2000 ppm. Contents below 400 ppm tend to lead to failure in the oven (=splintering), and contents above 2000 ppm have no further improving effect on the foil and therefore merely reduce cost-effectiveness, and can lead to migration of the stabilizer out of the foil into a packaged food. Contents above 2000 ppm moreover tend to lead to formation of gels and to an undesired yellow tinge in the foil.

Free-radical scavengers used can be either one compound or a mixture of various free-radical scavengers, preference being given to use of one compound as free-radical scavenger. The free-radical scavenger(s) used is/are preferably selected from the group of the phenolic antioxidants.

Preferred free-radical scavengers are pentaerythritol tetrakis[3-(3,5-di-tert-butyl-4-hydroxyphenyl)propionate] (CAS No. 6683-19-8) and 1,3,5-trimethyl-2,4,6-tris(3,5-di-tert-butyl-4-hydroxybenzyl)benzene) (CAS No. 1709-70-2), obtainable with trade names IRGANOX® 1010 and IRGANOX® 1330 from BASF.

The effectiveness of the free-radical scavenger can be tested directly on the packaging, e.g. after removal of the packaging from the oven. The packaging is classified as good here (=suitable for the application) if no splintering is observed at any point on the foil of the present invention.

The sealable upper foil (B) of the invention can be comprised of two or three layers. A three-layer structure of the upper foil (B) made of the layers B'B''B''' has proved to be advantageous for achieving the abovementioned properties, in particular the very good optical properties required of the polyester foil. The upper foil (B) of the invention then comprises the base layer B'', the sealable outer layer B' on one side of the base layer B'', and the outer layer B''' on the other side of the base layer B''.

The thickness of the outer layer B''' is generally from 0.5 to 3 µm, and the said layer preferably consists of the polyester that is also used for the base layer (B''); it is preferably CHDM-free.

The total thickness of the polyester foil (B) of the invention can vary within defined limits. It is from 20 to 125 µm, preferably from 25 to 100 µm and particularly preferably from 30 to 75 µm. If the thickness of the foil (B) is below 20 µm, the mechanical properties and barrier properties of the foil are inadequate. If, on the other hand, the thickness of the foil (B) is above 125 µm, the sealability of the foil becomes impaired and moreover production of the foil becomes uneconomic; both of these situations are undesirable.

The invention provides, in addition to the above, a process for the production of the polyester foil (B) of the invention by the coextrusion process known from the literature.

For the purposes of the said process, the procedure is that the melts corresponding to the individual layers (B',B'' and, if present, B''') of the upper foil (B) are coextruded through a flat-film die, the resultant foil is taken off on one or more rolls for solidification, the foil is then biaxially stretched, and the biaxially stretched foil is heat-set.

The biaxial stretching is carried out sequentially. It is preferable here to begin by stretching in the longitudinal direction (i.e. in machine direction) and then to stretch in transverse direction (i.e. perpendicularly to machine direction). The stretching in longitudinal direction can be achieved with the aid of a plurality of rolls rotating at different speeds corresponding to the desired stretching ratio. For the transverse stretching, an appropriate tenter frame is generally used.

As is conventional in the coextrusion process, the polymers or polymer mixtures for the individual layers are first compressed and plastified in respective extruders; the additives optionally provided can already be present here in the polymer or in the polymer mixture. The melts are simultaneously forced through a flat-film die, and the multilayer melt extruded is taken off on one or more take-off rolls, where the melt cools and solidifies to give a prefilm.

The temperature at which stretching is carried out can vary within a relatively wide range, and depends on the desired properties of the foil. The longitudinal stretching is generally carried out at a temperature in the range from 80 to 130° C., and the transverse stretching is generally carried out at a temperature in the range from 90 to 150° C. The longitudinal stretching ratio is generally in the range from 2.5:1 to 6:1, preferably from 3.0:1 to 5.5:1. The transverse stretching ratio is generally in the range from 3.0:1 to 5.0:1, preferably from 3.5:1 to 4.5:1.

In the heat setting that follows, the foil is kept for a period of about 0.1 to 15 s at a temperature of about 160 to 240° C. The foil is then wound conventionally.

Properties According to the Invention

The sealable polyester foil (B) of the invention, produced by the process of the invention, has a large number of properties, of which the most important are listed below.

The haze of the sealable polyester foil (B) is below 5.0%. The haze of the polyester foil is preferably below 4.5% and particularly preferably below 4.0%.

The clarity of the sealable polyester foil (B) is above 80%. The clarity of the polyester foil is preferably above 85% and particularly preferably above 90%.

The transparency of the sealable polyester foil (B) is above 89. Transparency is preferably above 90 and particularly preferably above 90.5.

The gloss of the sealable polyester foil (B) is above 130 and in the preferred embodiment above 140, and in the particularly preferred embodiment above 150.

The outer layer (B') exhibits good sealing properties with respect to itself, and in particular with respect to the lower foil (A). At a sealing temperature significantly below the melting point of the base layer (B''), the foil has good adhesion on the materials mentioned. The seal seam strength of the outer layer (B') after sealing at 200° C. (460 N, 2 s), with respect to itself and with respect to the lower foil (A) is above 2 N/15 mm and is up to 7 N/15 mm.

The polyester foil (B) features very good winding behaviour.

The polyester foil (B) has excellent suitability for the packaging of foods and of other consumable items, in particular for the packaging of foods and other consumable items in ready-meal trays in which sealable polyester foils are used for the opening of the packaging.

Table 2 collates inter alia the most important foil properties of the invention.

TABLE 2

| | Range of the Invention | Preferred | Particularly Preferred | Unit | Measurement Method |
|---|---|---|---|---|---|
| Outer layer (B') of upper foil (B) | | | | | |
| Portion of Polyester | | ≥92 | ≥94 | % by wt | |
| Polyester I in Polyester of outer layer (B') | 85-97 | 90-97 | 92-97 | % by wt | |
| Polyester II in Polyester of outer layer (B') | 3-15 | 3-10 | 3-8 | % by wt | |
| SV value of Polyester I | 680-900 | 710-880 | 740-850 | | in-house |
| Particle Diameter $d_{50}$ | 1.5-5.0 | 1.5-4.5 | 1.5-4.0 | μm | in-house |
| Concentration of filler | 0.04-0.35 | 0.05-0.30 | 0.06-0.25 | % | in-house |
| Ratio of particle size $d_{50}$ to layer thickness | >1.1 | >1.1 | >1.2 | | |
| Layer thickness | 1.5-4 | | | μm | in-house |
| Properties of Upper Foil (B) | | | | | |
| Foil haze | <50 | <45 | <40 | % | ASTM D1003-61, Method A |
| Foil clarity | >80 | >85 | >90 | % | ASTM D1003 |
| Foil tranparency | >89 | >90 | >90.5 | | DIN 1033-77 |
| Foil gloss | >130 | >140 | >150 | | DIN 67530 |
| Seal seam strength (B') with respect to itself and with respect to lower foil (A) | 2.0-7.0 | 2.0-6.5 | 2.0-6.0 | N/15 mm | in-house |
| Foil Thickness | 20-125 | 25-100 | 30-75 | μm | |

Definitions and Conventions

The term heat-sealable describes the property of a multilayer polyester foil which comprises at least one base layer (B) and comprises at least one heat-sealable outer layer (A). The heat-sealable outer layer (A) is bonded by means of sealing jaws to a substrate made of thermoplastic, e.g. ready-meal trays made of polyester or made of APET, through application of heat (from 110 to 220° C.) and pressure (from 1 to 6 bar) within a defined time (from 0.1 to 4 sec), without plastification of the actual base layer (B). In order to achieve this, the melting point of the polymer of the outer layer (A) is generally significantly lower than that of the polymer of the base layer. If, by way of example, polyethylene terephthalate with melting point 254° C. is used as polymer for the base layer, the melting point of the heat-sealable outer layer (A) is generally significantly below 220° C. In the present case, the main polymer for the sealable outer layer of the upper foil is almost 100% amorphous.

The test methods used to characterize the materials and the foils for the purposes of the present invention were as follows.

Test Methods

Modulus of Elasticity

Modulus of elasticity is determined in accordance with DIN EN ISO 527-1 and -3 (type 2 test sample) on foil strips measuring 100 mm×15 mm. Area modulus of elasticity is calculated in accordance with the following formula $$E_{area} = \sqrt{(E_{ND}^2 + E_{TD}^2)}$$

$\sigma_5$ Value

The $\sigma_5$ value is determined in accordance with DIN EN ISO 527-1 and -3 (type 2 test sample) on foil strips measuring 100 mm×15 mm.

Density

Foil density is determined in accordance with ASTM D1505-68, Method C.

Haze, Clarity and Transparency

An XL-211 HAZE-GARD® haze meter from BYK Gardner is used to test the polyester foils. Hölz haze was determined in accordance with ASTM D1003-61, Method A. Haze-gard equipment is used to measure clarity in accordance with ASTM D1003, but this time using the "clarity port" of the test equipment. Transparency is measured in accordance with ASTM D1033-61, Method A. All of the measurements are made directly after the foil production.

20° Gloss

Gloss is determined in accordance with DIN 67530. Reflectance is measured, this being an optical value characteristic of the surface of a foil. Using a method based on the standards ASTM D523-78 and ISO 2813, the angle of incidence is set at 20°. A beam of light hits the flat test surface at the set angle of incidence and is reflected or scattered thereby. A proportional electrical value is displayed, representing light incident on the photoelectric detector. The measured value is dimensionless, and must be stated together with the angle of incidence.

Standard Viscosity SV

Standard viscosity in dilute solution SV was measured by a method based on DIN 53 728 Part 3 in an Ubbelohde viscometer at 25±0.05° C. Dichloroacetic acid (DCA) was used as solvent. The concentration of the dissolved polymer was 1 g of polymer/100 ml of pure solvent. Dissolution of the polymer took one hour at 60° C. If the samples have not been completely dissolved after this time, two further attempts at dissolution were made, in each case for 40 min at 80° C., and the solutions were then centrifuged for 1 hour at a rotation rate of 4100 $min^{-1}$.

The dimensionless SV value is determined as follows from the relative viscosity ($\eta_{rel} = \eta/\eta_s$):

$$SV = (\eta_{rel} - 1) \times 1000$$

The particle content in the foil or polymer material was determined by ashing and corrected by increasing input weight accordingly, i.e.:

$$\text{Input weight} = \frac{\text{(Input weight corresponding to 100\% of polymer)}}{[(100 - \text{particle content in \% by weight}) \cdot 0.01]}$$

Median Particle Diameter $d_{50}$

A Malvern MASTERSIZER® 2000 is used to determine the median diameter $d_{50}$ of the particle to be used. For this, the samples are charged with water to a cell, and this is then placed into the test equipment. A laser is used to analyse the dispersion, and the particle size distribution is determined from the signal by comparison with a calibration curve. The particle size distribution is characterized by two parameters, the median value $d_{50}$ (=measure of position of the central value) and the degree of scattering, the value known as SPAN98 (=measure of scattering of the particle diameter). The measurement procedure is automatic, and also includes mathematical determination of the $d_{50}$ value. The $d_{50}$ value here is defined as being determined from the (relative) cumulative particle size distribution curve: The point of intersection of the 50% ordinate value with the cumulative curve provides the desired $d_{50}$ value on the abscissa axis.

Measurements on the foil produced by using the said particles give a $d_{50}$ value that is lower by 15 to 25% than that of the particles used.

Puncture Resistance (=Puncture Test)

Puncture resistance is measured in accordance with EN 14477. Exposure to hard, sharp or angular objects is an important factor in the packaging sector. Puncture resistance is then of interest when the foils, in the form of packaging material, are by way of example used for food or for sharp-edged components. The puncture test in accordance with EN 14477 is used to measure this property in respect of a probe with diameter 0.8 mm. This test is also known as the Parker pen test.

Determination of Thermoforming Properties

The thermoforming properties of the lower foil (A) were determined by thermoforming the foil in a Multivac machine (e.g. R245/SN:166619) under the following molding conditions: mold temperatures 210° C., heating time: from 2 to 3 s, explosive forming/compressed air reservoir 2 bar, molding pressure 2 bar tested, molding: 2 s. The formats set for the trays to be produced can be found in FIG. 1. The two properties that characterize the thermoformability of the foil of the invention are maximal draw depth in mm of the lower foil of the invention (=tray depth) and draw depth ratio $A_{tray}/A_{foil}$ ($A_{tray}$=surface area of thermoformed tray, $A_{foil}$=surface area of foil used of the invention).

Determination of Barrier Properties

Water vapour transmission rate (WVTR) was measured on foils of various thicknesses at 23° C. and 85% r. h. in accordance with ISO 15106-3. Oxygen barrier (OTR) was measured by using an OXTRAN® 100 from Mocon Modern Controls (USA) in accordance with ISO 15105-2, Annex A, 23.0° C./50% r.h. OTR was likewise measured here on films of various thicknesses.

Seal Seam Strength (DIN 55529)

Seal seam strength of the upper foil (B) with respect to itself was determined by placing two film strips of width 15 mm of the foil of the invention on top of one another and pressing these together at 200° C. for a period of 3 s, using a "sealing pressure" of 460 N (equipment: Brugger NDS, single-side-heated sealing jaw). In order to avoid sticking on the sealing jaw, a crystalline polyester foil of thickness 12 µm was placed between the foil of the invention and the sealing jaw. Seal seam strength (maximal force) was determined at a velocity of 200 mm/min with a peel angle of 90° (90°-peel method).

Seal seam strength of the upper foil (B) with respect to the lower foil (A) was determined by placing the amorphous side of a foil strip of width 15 mm onto a strip of the same size of the lower foil (A). Because of the stiffness of the substrate, seal seam strength (maximal force) was determined at a peel angle of 180°. Sealing can be said to have occurred when the force measured is >1 N/15 mm.

The invention is explained in more detail with reference to examples below.

Inventive Example 1

I Production of Thermoformable Lower Foil (A)

A biaxially oriented foil (A) made of an ethylene terephthalate-ethylene isophthalate copolymer was produced by the process of the invention. The thickness of the foil was 96 µm. Chips made of the copolymer were introduced to the extruder for producing the lower foil. The copolymer was melted and homogenized in the extruder in accordance with the process conditions listed in the table below.

After filtration, the melt was shaped in a flat-film die and discharged by way of the die lip. The melt film was cooled, and a transparent single-layer foil was produced by way of stepwise orientation in longitudinal and transverse direction, followed by setting.

Between the longitudinal stretching and the transverse stretching, a reverse-gravure process was used to coat an aqueous dispersion onto the foil, in order to achieve good winding of the same. The coating (C), which undergoes acrylic crosslinking in the tenter frame, comprises a 4.5% by weight dispersion of a latex consisting of a copolymer of 60% by weight of methyl methacrylate, 35% by weight of ethyl acrylate and 5% by weight of N-methylolacrylamide and a surfactant. The dry weight of the coating (based on the biaxially oriented foil) was about 0.035 g/m².

The copolymer for the lower foil (A) of the invention has the following composition:

89 mol % ethylene terephthalate units 11 mol % ethylene isophthalate units

The production conditions in the individual steps were

| Extrusion | Temperatures for the melt of (A) | 270° C. |
|---|---|---|
| | Temperature of take-off roll | 20° C. |
| Longitudinal stretching | Heating temperature of rolls | 70-90° C. |
| | Stretching temperature | 86° C. |
| | Longitudinal stretching ratio | 3.0 |
| Transverse stretching | Temperature of heating fields | 118° C. |
| | Stretching temperature | 135° C. |
| | Transverse stretching ratio | 3.4 |
| Setting | Temperature | 185° C. |
| | Duration | 9 s |

Table 3 shows the composition of the lower foil (A), and also other information relating to the foil of the invention, in particular the properties of the foil of the invention.

II Production of Sealable Upper Foil (B)

The following starting materials were used for the individual coextruded layers (B'B"B'") for the production of the sealable upper foil (B) described below:

Outer layer B'

95% by weight of amorphous polyester I made of 67 mol % of ethylene terephthalate and 33 mol % of cyclohexanedimethylene terephthalate with SV value 780 (cf. also: "Broschüre von Eastman, EASTMAN™ 6763 Copolyester Thermoforming" [i.e. Eastman Corp. brochure relating to EASTMAN™ 6763 thermoforming copolyester])

5% by weight of semicrystalline polyester II (100 mol % of ethylene terephthalate) and 1.5% by weight of SYLOB-LOC® 46 (synthetic $SiO_2$ from Grace, $d_{50}$: 3.2 µm)

Base Layer B"

100% by weight of polyethylene terephthalate with SV value 800

Outer Layer B'''
95% by weight of polyethylene terephthalate
5% by weight of 98.5% by weight of polyethylene terephthalate and 1.5% by weight of SYLOBLOC® 46

The abovementioned raw materials were in each case melted in one extruder per layer, and extruded through a three-layer flat-film die with A-B-C structure onto a chilled take-off roll. The resulting amorphous prefilm was then longitudinally stretched. The foil was then transversely stretched, set and rolled (final foil thickness 42 μm). The production conditions in the individual steps were as follows:

| | | |
|---|---|---|
| Extrusion | Temperatures for the melting of (B', B'', B''') | 270° C. |
| | Temperature of take-off roll | 20° C. |
| Longitudinal stretching (Mirror stretching) | Heating temperature of rolls | 80-120° C. |
| | Stretching temperature | 115° C. |
| | Longitudinal stretching ratio | 4.0 |
| Transverse stretching | Temperature of heating fields | 80-135° C. |
| | Stretching temperature | 135° C. |
| | Transverse stretching ratio | 4.2 |
| Setting | Temperature | 230° C. |
| | Duration | 3 s |

Table 4 shows the composition of the foil, and also other information relating to the foil of the invention, in particular to the properties of the foil of the invention.

III Production of Packaging

Figure 1:
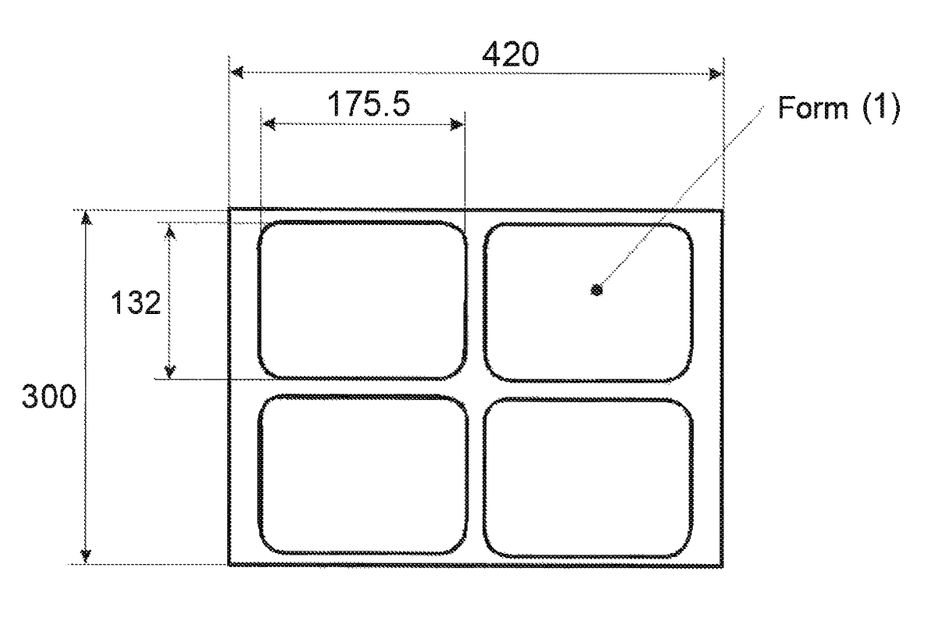
FIG. 1 is a schematic drawing of the format set for the trays produced in accordance with Example 1.

The lower foil (A) and the upper foil (B) were respectively separately clamped into a Multivac machine (R 245/SN:166619). The molding conditions under which the lower foil (A) was thermoformed were: mold temperatures 210° C., heating time: from 2 to 3 s, explosive forming/compressed air reservoir 2 bar, molding pressure 2 bar tested, molding: 2 s. The formats set for the trays to be produced can be found in FIG. 1, illustrating Form (1) inter alia. The draw depth of the lower foil (A) was up to 75 mm, and the draw depth ratio was up to 2.86.

The mold was cooled, and the thermoformed lower foil (A) was discharged therefrom. A portion of pork was placed into the cavity, and the upper foil (B) was brought into contact with the upper side of the lower foil (A). The manner in which the upper foil (B) was placed onto the lower foil (A) was such that the heat-sealable surface (BC) of the upper foil (B) was in contact with the portion of meat and with the lower foil (A). Heat-sealing was carried out in the same machine at a temperature of 160° C., for 2 s at a pressure of 2 bar. The weight of the portion of meat was about 1000 g. The pack was placed into a conventional oven and cooked for 60 minutes at 220° C. After about 10 min, the desired self-venting was observed. Once the cooking cycle had ended, the upper foil (B) was peeled manually from the lower foil (A) of the packaging, without any resultant tearing of either of the two foils. The meat was cooked and had become crisp and brown.

Inventive Example 2

In comparison with Inventive Example 1, only the production process for the lower foil (A) was modified. Convergence during setting was now 1.75%; in Inventive Example 1 it was 0%. The overall result was similar; the puncture resistance of the lower foil (A) was slightly increased.

Comparative Example 1

In comparison with Inventive Example 1, the proportion of isophthalate in the lower foil (A) was reduced to 5.0 mol %; this was the only change.

Comparative Example 2

Example 1 from EP 1 697 129 B1 was repeated. Table 4 shows the properties of the foil. The laminate is suitable for the applications mentioned in the introduction, but requires improvement in thermoformability and puncture resistance, and especially requires improvement in optical properties (haze and clarity).

Comparative Example 3

Example 1 from EP 1 945 512 B1 was repeated. The process is suitable for the applications mentioned in the introduction; however, the foils described in more detail in EP 1 945 512 B1 require improvement in thermoformability and puncture resistance, and especially require improvement in optical properties (haze and clarity).

TABLE 3

| | | Lower foil (A) | | | | | | | | | | | |
|---|---|---|---|---|---|---|---|---|---|---|---|---|---|
| | | Composition for Polyester for Foil | | | Modulus of Elasticity for foil | | Area Mod. of Elast. | σ5-Value of foil | | Total of σ5-values of foil | Density | Foil Haze % | Foil Clarity % | Foil Gloss | |
| | | T | I | E | long. | trans. | for Foil N/mm² | long. | trans. | | | | | A-Side | B-Side |
| | | Mol-% | | | | | | | | | | | | | |
| Inv. Ex. | 1 | 89 | 11 | 100 | 3874 | 4479 | 5922 | 98 | 99 | 197 | 1.385 | 0.4 | 100 | 205 | 205 |
| | 2 | 89 | 11 | 100 | 3843 | 4294 | 5763 | 94 | 103 | 197 | 1.286 | 0.4 | 100 | 204 | 203 |
| Comp. Example | 1 | 95 | 5 | 100 | 4110 | 4569 | 5145 | 103 | 100 | 203 | 1.392 | 0.4 | 100 | 215 | 214 |
| | 2 | 76.2 μm PA + 25.4 μm APET | | | | | | | | | | 17 | 75 | 74 | 76 |
| | 3 | 50 μm Polyester | | | 4175 | 4175 | 5904 | | | | | 5 | | 120 | 120 |

TABLE 3-continued

Lower foil (A)

|  |  | Transparency % | SV-Value o Foil | Puncture Resistance | Thermoformability depth mm | Thermoformability $A_{tray}/A_{Foil}$ | Barrier Properties of foil OTR cm³/ (m² × bar × d) | Barrier Properties of foil WVTR g/(m² × d) | Winding Behavior |
|---|---|---|---|---|---|---|---|---|---|
| Inv. Ex. | 1 | 90 | 777 | 0.395 | 75 | 2.86 | 16 | 1.89 | very good |
|  | 2 | 91 | 777 | 0.398 | 75 | 2.86 | 16 | 1.89 | very good |
| Comp. Example | 1 | 91 | 787 | 0.36 | 55 | 2.00 |  |  | very good |
|  | 2 | 88 |  |  | 65 | 2.00 |  |  |  |
|  | 3 | 90 |  |  | 55 | 2.00 |  |  |  |

TABLE 4

Upper foil (B)

|  |  | Composition of Copolyester I in outer layer B' T Mol-% | Composition of Copolyester I in outer layer B' I Mol-% | Composition of Copolyester I in outer layer B' E Mol-% | Composition of Copolyester I in outer layer B' CHDM Mol-% | Composition of Copolyester II in outer layer B' T Mol-% | Composition of Copolyester II in outer layer B' I Mol-% | Composition of Copolyester II in outer layer B' E Mol-% | SV-Value Polyester I | Foil structure | Foil thickness B μm | Outer Layer Thickness B' μm | Outer Layer Thickness B''' μm | Particles in Outer layer B' Diameter μm | Particles in Outer layer B' Concentration % |
|---|---|---|---|---|---|---|---|---|---|---|---|---|---|---|---|
| Inv. Ex. | 1 | 100 | 70 | 30 |  | 100 | 100 |  | 780 | B'B''B''' | 42 | 2.7 | 2 | 3.2 | 0.075 |
|  | 2 | 100 | 70 | 30 |  | 100 | 100 |  |  | B'B''B''' | 42 | 2.7 | 2 | 3 | 0.075 |
| Comp. Ex. | 1 | 100 | 70 | 30 |  | 100 | 100 |  |  | B'B''B''' | 42 | 2.7 | 2 | 3 | 0.075 |
|  | 2 |  |  |  |  |  |  |  |  |  |  |  |  |  |  |
|  | 3 |  |  |  |  |  |  |  |  |  |  |  |  |  |  |

|  |  | Ratio $d_{50}/d_{(B')}$ | Seal seam strength (FIN and with respect to Lower Foil A) 200° C. N/15 mm | Haze % | Clarity % | Transparency % | Gloss |
|---|---|---|---|---|---|---|---|
| Inv. Ex. | 1 | 1.19 | 3 | 2.5 | 87 | 90.5 | 170 |
|  | 2 | 1.11 | 3 | 2.5 | 87 | 90.5 | 168 |
| Comp. Ex. | 1 | 1.11 | 3 | 2.5 | 87 | 90.5 | 168 |
|  | 2 |  |  |  |  |  |  |
|  | 3 |  |  |  |  |  |  |

T = Terephthalate,
I = Isophthalate,
E = Ethylene,
CHDM = 1,4-Cyclohexandimethanol That which is claimed:

1. Transparent packaging for vacuum forming comprising a biaxially oriented thermoformable polyester foil as lower foil (A) and a biaxially oriented polyester foil as upper foil (B) which can be heat-sealed to the lower foil (A), wherein
   I. the lower foil (A) comprises at least 85% by weight of a copolyester having dicarboxylic acid components of which from 85 to 94 mol % are terephthalic-acid-derived units and from 6 to 15 mol % are isophthalic-acid-derived units, where the lower foil (A) has the following:
      a) area modulus of elasticity in the range from 4500 to 6400 N/mm²,
      b) total of strength values ($\sigma_5$ value) in longitudinal direction and in transverse direction in the range from 170 to 220 MPa,
      c) density below 1390 kg/m³,
      d) haze below 2.0% and clarity at least 85% and
      e) thickness in the range from 50 to 300 μm;
   and
   II. the upper foil (B) comprises a base layer (B") and a heat-sealable outer layer (B') which can be heat-sealed with respect to lower foil (A), wherein:
      a) the heat-sealable outer layer (B') comprises at least 90% by weight of a thermoplastic polyester comprised of
         i) from 85 to 97% by weight of amorphous polyester I and
         ii) from 3 to 15% by weight of semicrystalline polyester II,
      c) the heat-sealable outer layer (B') comprises from 0.04 to 0.35% by weight of inorganic and/or organic particles with median diameter $d_{50}$ from 1.5 to 5.0 μm, where the ratio of particle size $d_{50}$ to layer thickness over the outer layer (B') is greater than 1.0,
      d) the heat-sealable outer layer (B') has a thickness of from 1.5 to 4.0 μm,
      e) the upper foil (B) has a haze of below 5.0% and a clarity of at least 85%, f) the upper foil (B) has a seal seam strength with respect to itself, which is thin sealing, and with respect to the lower foil (A) is in the range from 2 to 7 N/15 mm and g) the upper foil (B) has a thickness in the range from 20 to 125 μm.

2. Transparent packaging according to claim 1, wherein the lower foil (A) has an area modulus of elasticity in the range from 4500 to 6300 N/mm².

3. Transparent packaging according to claim 1, where the lower foil (A) and the upper foil (B) are antimony-free.

4. Transparent packaging according to claim 1, wherein the lower foil (A) and/or the base layer (B") comprise(s) one or more free-radical scavengers.

5. Transparent packaging according to claim 4, wherein the free-radical scavenger(s) is/are phenolic antioxidants.

6. Transparent packaging according to claim 5, wherein the phenolic antioxidants are selected from the group consisting of pentaerythritol tetrakis[3-(3,5-di-tert-butyl-4-hydroxyphenyl)propionate] and 1,3,5-trimethyl-2,4,6-tris(3,5-di-tert-butyl-4-hydroxybenzyl)benzene.

7. Biaxially oriented thermoformable polyester foil as lower foil (A) for a transparent packaging comprising at least 85% by weight of a copolyester having dicarboxylic acid components of which from 85 to 94 mol % are terephthalic-acid-derived units and from 6 to 15 mol % are isophthalic-acid-derived units, where the lower foil has the following:
a) area modulus of elasticity in the range from 4500 to 6400 N/mm²,
b) total of strength values ($\sigma_5$ value) in longitudinal direction and in transverse direction in the range from 170 to 220 MPa,
c) density below 1390 kg/m³,
d) haze below 2.0% and clarity at least 85% and
e) thickness in the range from 50 to 300 μm.

8. Biaxially oriented thermoformable polyester foil as claimed in claim 7, wherein the area modulus of elasticity for the lower foil (A) ranges from 4500 to 6300 N/mm².

9. Biaxially oriented thermoformable polyester as upper foil (B) for a transparent packaging comprising a base layer (B") and a heat-sealable outer layer (B'), wherein
a) the heat-sealable outer layer (B') comprises at least 90% by weight of a thermoplastic polyester comprised of
i) from 85 to 97% by weight of amorphous polyester I and
ii) from 3 to 15% by weight of semicrystalline polyester II,
c) the heat-sealable outer layer (B') comprises from 0.04 to 0.35% by weight of inorganic and/or organic particles with median diameter $d_{50}$ from 1.5 to 5.0 μm, where the ratio of particle size $d_{50}$ to layer thickness over the outer layer (B') is greater than 1.0,
d) the thickness of the outer layer (B') is from 1.5 to 4.0 μm,
e) the upper foil (B) has a haze of below 5.0% and a clarity of at least 85%,
f) the upper foil (B) has a seal seam strength with respect to itself, which is thin sealing, is in the range from 2 to 7 N/15 mm and
g) the upper foil (B) has a thickness is in the range from 20 to 125 μm.

10. Process for the production of a transparent packaging for vacuum forming according to one or more of claim 1 comprising
(a) producing the lower foil (A) by extrusion or coextrusion comprising
(i) biaxially stretching of the extruded or coextruded lower foil (A)
in a longitudinal direction at a temperature of from 70° to 100° C. with a longitudinal stretching ratio of from 2.2:1 to 3.8:1, and
in a transverse direction at a temperature of from 90° to 140° C. with a transverse stretching ratio of from 2.2:1 to 3.8:1, and
heat setting the biaxially stretched lower foil (A) for from 5 to 25 s at from 175° to 220° C.; and
(b) producting the upper foil (B) by
(i) coextruding of the melts corresponding to the individual layers (B', B" and, if present, B"') of the upper foil (B) through a flat-film die,
(ii) taking-off of the resultant foil on one or more rolls for solidification, and then
(iii) biaxially stretching and heat setting the upper foil (B).

11. A ready-meal tray comprising the transparent packaging for vacuum forming according to claim 1.

12. The ready-meal tray as claimed in claim 11, wherein the ready-meal tray is a meat tray, a fish tray, a poultry tray or a dry, ready-to-eat product tray.

13. The ready-meal tray as claimed in claim 12, wherein the ready-to-eat product tray is a sandwich tray, burger tray or wrap tray.

* * * * *

UNITED STATES PATENT AND TRADEMARK OFFICE
CERTIFICATE OF CORRECTION

PATENT NO. : 10,618,260 B2
APPLICATION NO. : 16/445348
DATED : April 14, 2020
INVENTOR(S) : Peiffer et al.

Page 1 of 1

It is certified that error appears in the above-identified patent and that said Letters Patent is hereby corrected as shown below:

In the Claims

Column 30
Claim 10, Line 33, delete "(B', B'' and, if present, B''')" insert --(B', B'' and, if present, B''')--

Signed and Sealed this
Twenty-third Day of June, 2020

Andrei Iancu
*Director of the United States Patent and Trademark Office*